United States Patent
Pfaller et al.

[11] Patent Number: 5,984,243
[45] Date of Patent: Nov. 16, 1999

[54] PIPE CUSHION

[75] Inventors: Mark J. Pfaller, Memphis; Mark R. Drane, Germantown; James K. Warren, Collierville, all of Tenn.

[73] Assignee: Thomas & Betts International, Inc., Sparks, Nev.

[21] Appl. No.: 08/926,216

[22] Filed: Sep. 9, 1997

[51] Int. Cl.⁶ .................................................. F16L 3/08
[52] U.S. Cl. ............................................................. 248/74.1
[58] Field of Search .................................. 248/74.1, 903, 248/74.2

[56] References Cited

U.S. PATENT DOCUMENTS

| | | | |
|---|---|---|---|
| 470,698 | 3/1892 | Murdock | 248/74.1 |
| 2,399,899 | 5/1946 | Tinnerman | 174/40 CC |
| 2,440,469 | 4/1948 | Goddard | 248/68.1 |
| 2,761,714 | 9/1956 | Cuskie | 248/74.1 |
| 2,872,141 | 2/1959 | Hefner | 248/62 |
| 2,998,228 | 8/1961 | Englis et al. | 248/74.3 |
| 3,154,281 | 10/1964 | Frank | 248/201 |
| 3,203,653 | 8/1965 | Hall | 248/54 |
| 3,341,231 | 9/1967 | Johanson | 285/322 |
| 3,370,815 | 2/1968 | Opperthauser | 248/74.2 |
| 3,397,431 | 8/1968 | Walker | 403/344 |
| 3,414,220 | 12/1968 | Walker | 248/68.1 |
| 3,429,014 | 2/1969 | Roche | 24/279 |
| 3,486,726 | 12/1969 | Kindorf et al. | 248/72 |
| 3,521,842 | 7/1970 | Opperthauser | 248/74.2 |
| 3,606,218 | 9/1971 | Enlund et al. | 248/74.2 |
| 3,684,223 | 8/1972 | Logsdon | 248/74.3 |
| 3,778,537 | 12/1973 | Miller | 174/138 R |
| 3,843,083 | 10/1974 | Angibaud | 248/229.14 |
| 3,848,839 | 11/1974 | Tillman | 248/74.2 |
| 4,037,810 | 7/1977 | Pate | 248/68.1 |
| 4,185,802 | 1/1980 | Myles et al. | 248/74.4 |
| 4,213,589 | 7/1980 | Pierron et al. | 248/74.1 |
| 4,417,755 | 11/1983 | Gittleman | 285/373 |
| 4,442,994 | 4/1984 | Logsdon | 248/547 |
| 4,470,179 | 9/1984 | Gollin et al. | 24/543 |
| 4,516,296 | 5/1985 | Sherman | 24/279 |
| 4,612,680 | 9/1986 | Daiguju | 14/22 |
| 4,614,321 | 9/1986 | Andre | 248/74.2 |
| 4,640,479 | 2/1987 | Shely et al. | 248/56 |
| 4,653,782 | 3/1987 | Munday | 285/373 |
| 4,934,635 | 6/1990 | Sherman | 248/74.1 |
| 4,997,148 | 3/1991 | Sherman | 248/74.1 |
| 5,013,002 | 5/1991 | Lefferts et al. | 248/74.1 |
| 5,013,166 | 5/1991 | Domer | 384/220 |
| 5,018,260 | 5/1991 | Ziu | 24/555 |
| 5,547,152 | 8/1996 | Krock | 248/74.1 |

*Primary Examiner*—Ramon O. Ramirez
*Assistant Examiner*—Anita M. King
*Attorney, Agent, or Firm*—Hoffman & Baron, LLP

[57] ABSTRACT

An assembly for supporting a pipe to a structural channel includes a pipe cushion having a deformable pipe cushion body and a base for positioning on the structured channel. The base includes a slot therethrough. The body includes a continuous tubular wall extending from the base and is divided by the slot. The tubular wall forms a pipe supporting passageway through the body. The slot is in communication with the passageway and permits insertion of the pipe therein. The assembly also includes a pair of pipe clamp elements. The pipe clamp elements have a first end attachable to the channel and a second end for mutual connection to each other about the pipe cushion. The second ends of the pipe clamp elements are connectable at a crest of the body spaced from the slot.

19 Claims, 7 Drawing Sheets

PIPE CUSHION

FIELD OF THE INVENTION

The present invention relates generally to a support assembly for supporting an elongate pipe to a channel member. More particularly, the present invention is directed to a pipe cushion which supports the pipe within a two-piece pipe clamp.

BACKGROUND OF THE INVENTION

It is well known to support pipes and other elongate bodies with structural support channel. Pipe clamps may be used to support the pipe to the channel. Existing two-piece pipe clamp assemblies include a pair of clamp halves whereby each clamp half is positioned within the channel about the pipe and connected together using a threaded nut and bolt assembly through flanges in the clamp halves. Tightening of the nut and bolt assembly urges the clamp halves together securing the pipe to the channel.

The clamping forces employed to secure the clamp halves about the pipe may tend to bend or otherwise damage the pipe upon securing the pipe to the channel. In order to prevent such damage during securement, the art has seen the use of pipe cushions which may be positioned between the pipe and the pipe clamp.

For example U.S. Pat. No. 470,698 shows a bottom-opening pipe cushion in which the pipe is inserted through a lower slot therein. Bottom-opening pipe cushions of this type are designed for use with a single-member pipe clamp. These pipe cushions would not be suitable for use with a two-piece pipe clamp as the cushion would then exhibit a tendency to be pulled open at the insertion slot when a two-piece pipe clamp is tightened about the pipe cushion. Two-piece pipe clamps tend to pinch the bottom-opening pipe cushion body at its top surface, causing the pipe cushion body to be pulled about the surface of the pipe. The pulling of the pipe cushion body about the pipe surface results in the insertion slot being pulled open and may result in the pipe cushion body being lifted from the pipe at its top surface, resulting in further discontinuities between the pipe cushion and the inserted pipe.

In order to accommodate the use of two-piece pipe clamps, the art has developed improvements in pipe cushions. An example of an improved pipe cushion used in combination with a pipe clamp is shown in U.S. Pat. No. 4,967,148. The pipe cushion shown therein includes a generally cylindrical body formed from deformable material. The pipe is inserted into the cushion body through a slot in the upper end thereof opposite the slot. The slot divides the cushion body into two halves which must be pried open to load the pipe into the cushion. Once loaded into the cushion, the pipe clamp halves are secured about the pipe cushion to secure the pipe to the structural channel.

One disadvantage in the pipe cushions of the prior art is their failure to provide substantial continuous contact about the full circumference of an inserted pipe. United States U.S. Pat. Nos. 3,778,537 and 5,018,260 provide examples of various difference designs of such pipe cushions. Typically, the discontinuous contact is a result of an overly wide insertion slot which is too large to be closed by tightening of the clamp halves. Other times, the discontinuous contact is the result of an elongate notch provided on the interior surface of the pipe cushion so that the insertion slot may be more easily pried open for pipe insertion. The '148 patent provides an example of a pipe cushion having a weakened or open location in the pipe cushion body which facilitates flexing or deformation of the body thereabout. Constructions such as that of the '148 patent introduce a further area of discontinuity, in addition to the slotted opening, which lessens the protection to the pipe from the pipe clamp.

Another disadvantage in the pipe cushions of the prior art is the need to pry open those pipe cushions having very narrow insertion slots. Pipe cushions attempting to maximize the amount of contact between the pipe cushion and the inserted pipe can be cumbersome to install as they require greater deflection when receiving a pipe therein.

It is therefore desirable to provide an improved pipe cushion for use in a support assembly which may be easily fitted onto the pipe and which provides substantially continuous protective support of the pipe between the structural channel and the pipe clamp assembly.

SUMMARY OF INVENTION

It is an object of the present invention to provide a support assembly for supporting an elongate pipe to a channel member.

It is further object the present invention to provide a pipe cushion which supports and protects a pipe against a channel member and which is secured to the channel member by a pipe clamp.

It is another object of the present invention to provide a pipe cushion which is easily attachable to a pipe.

It is yet another object of the present invention to provide a bottom-opening pipe cushion providing substantially continuous contact about a pipe.

In the efficient attainment of these and other objects, the present invention provides an assembly for supporting a pipe to a structural channel. The assembly includes a pipe cushion including a deformable cushion body having a base for positioning on the structural channel. The base includes a slot therethrough. The pipe cushion body includes a continuous tubular wall extending from the base and being divided by the slot. The tubular wall forms a pipe supporting passageway therethrough. The slot in the base is in communication with the passageway for permitting insertion of the pipe therein to. A pair of pipe clamp elements are employed which include a first end attachable to the channel and an opposed second end for mutual connection about the pipe cushion. The second ends of the pipe clamp elements are connectable adjacent a crest of the pipe cushion body which is spaced from the slot.

The present invention also provides a pipe cushion body having a tapered lead into the slot as well as entry facilitating members to force the slot open prior to the pipe entering the slot so as to facilitate insertion of the pipe therethrough and into the passageway.

The present invention also provides an area of increased thickness on the crest of the body so as to resist separation from the pipe surface thereabout, upon attachment of the pipe clamps about the pipe cushion. The pipe cushion body is deformable about the crest so as to admit the pipe into the passageway.

The preferred embodiment of the present invention further includes locations along the wall of the cushion body and along the base which provides areas of raised relief for engagement with the pipe clamp elements for enhancing contact between the pipe and the pipe cushion including spaced apart groves 19a and 19b.

DETAILED DESCRIPTION OF THE PREFERRED EMBODIMENT

Figure 1:
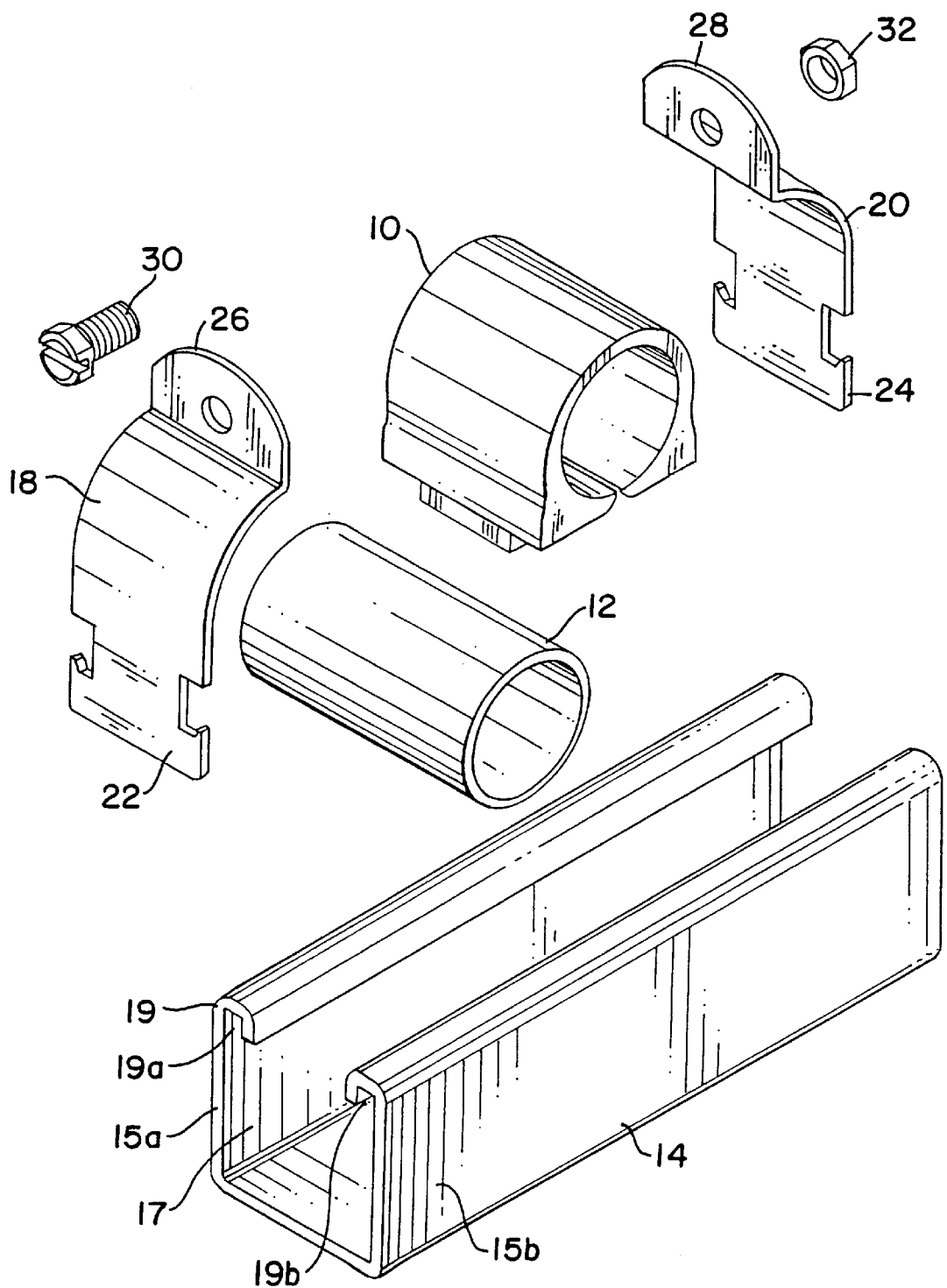
FIG. 1 is an exploded perspective view of the pipe cushion and clamp assembly of the present invention.
Figure 2:
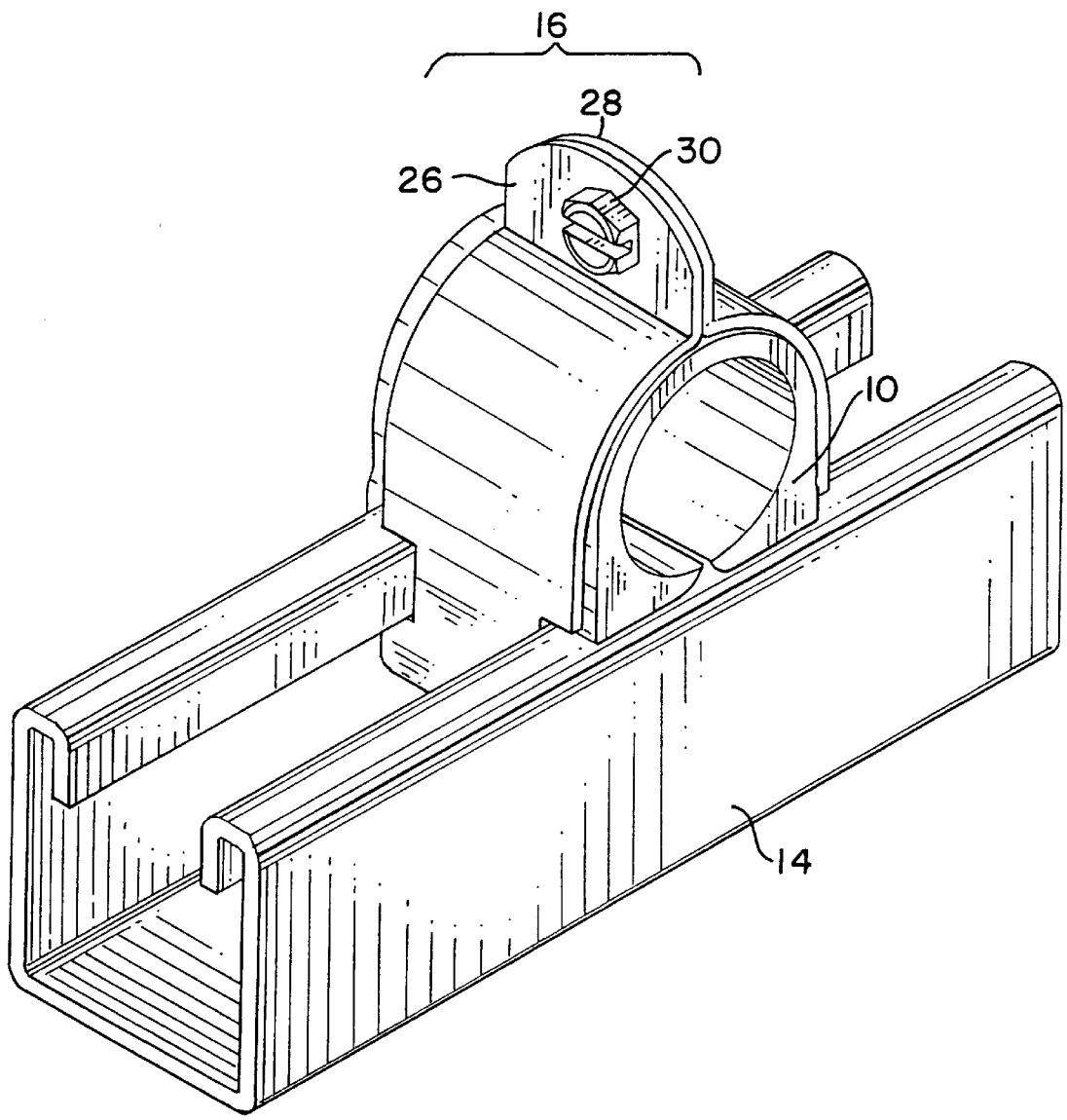
FIG. 2 is a perspective showing of the pipe cushion of FIG. 1 supported over a channel.

With reference to FIGS. 1 and 2, the present invention provides a pipe cushion 10 for supporting a pipe 12 to a structural channel 14. Pipe cushion 10 is secured to channel 14 by a two-piece pipe clamp 16.

Channel 14 and pipe clamp 16 are well known in the art and are both currently marketed by the assignee of the present invention under the trademarks KINDORF and SUPERSTRUT. Channel 14 is an elongate U-shaped member providing a pair of transversely-spaced sidewalls 15a, 15b which define a trough 17 therebetween. The free edges of sidewalls 15a, 15b are bent over into trough 17 to form a pair of elongate retaining grooves 19. Pipe clamp 16 includes identically-configured first clamp bracket 18 and second clamp bracket 20. Each clamp bracket 18, 20 includes a first end, 22, 24 for retentively engaging the retaining grooves 19 of channel 14 and a second end 26, 28 for fastening engagement to the other bracket. Fastening devices such as a threaded bolt 30 and nut 32 may be used to fasten second ends 26, 28 of brackets 18, 20 to each other.

Figure 3:
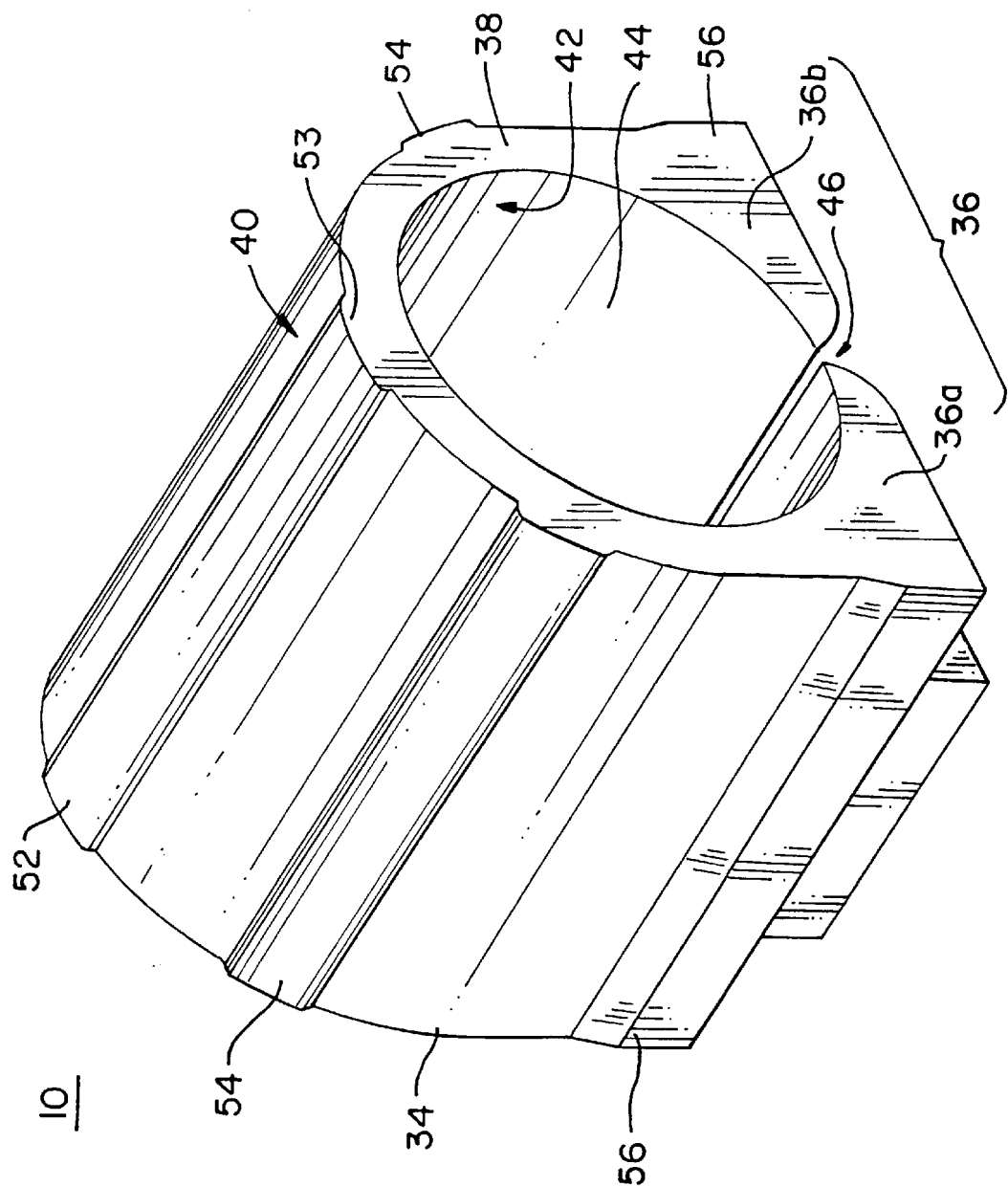
FIG. 3 is a perspective showing of the pipe cushion of FIG. 1.
Figure 4:
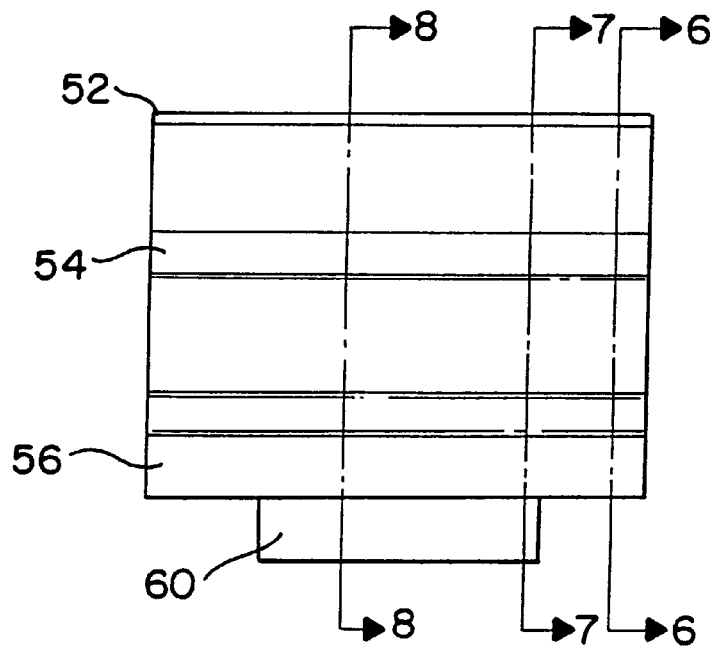
FIGS. 4 and 5 are side and front elevational showings of the pipe cushion of FIG. 3.
Figure 5:
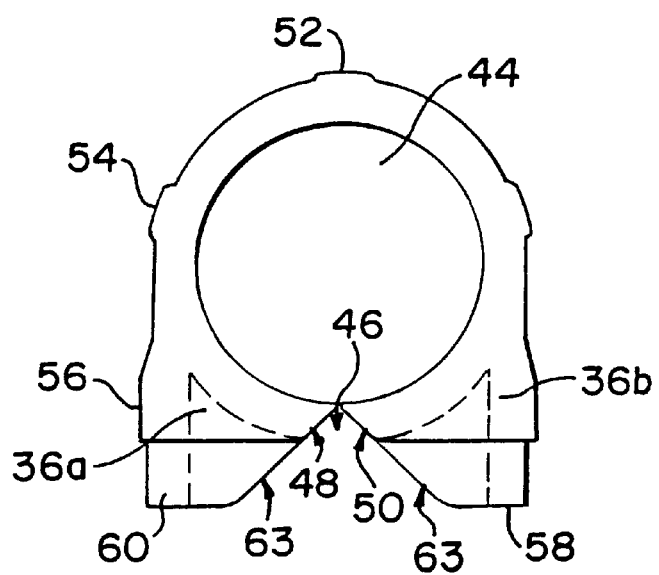
Figure 8:
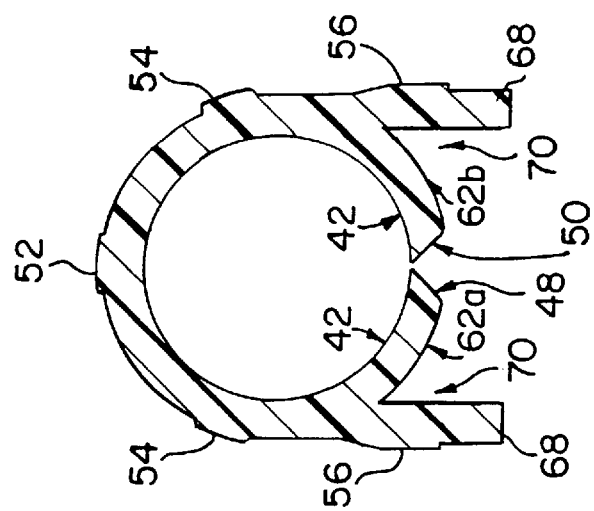
FIGS. 6, 7 and 8 are vertical cross-sectional showings of the pipe cushion of FIG. 4 taken respectively through the lines 6—6, 7—7 and 8—8 thereof.
Figure 7:
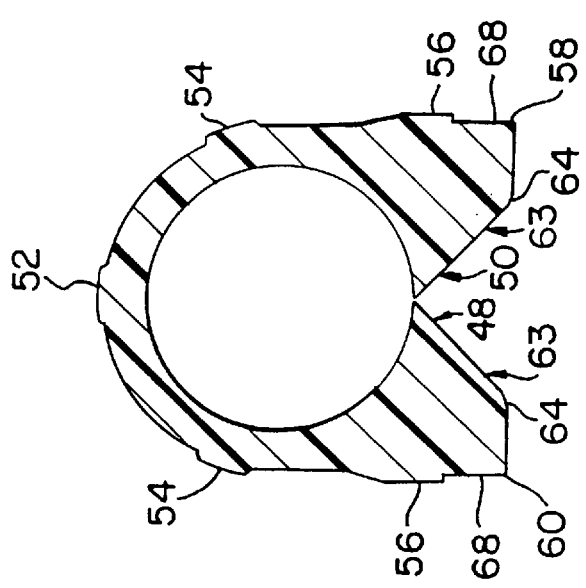
Figure 6:
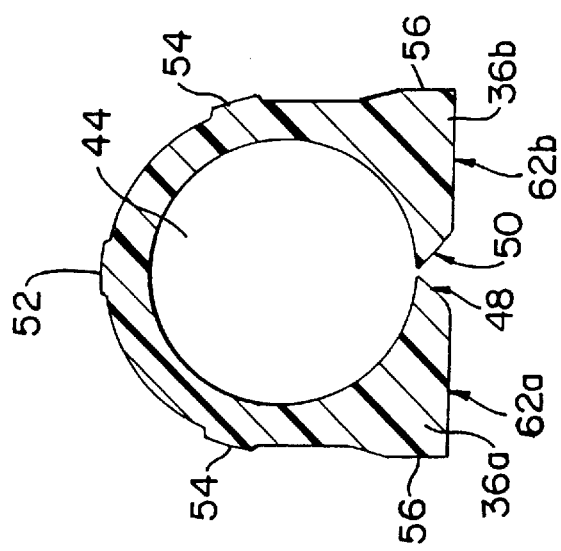
Figure 9:
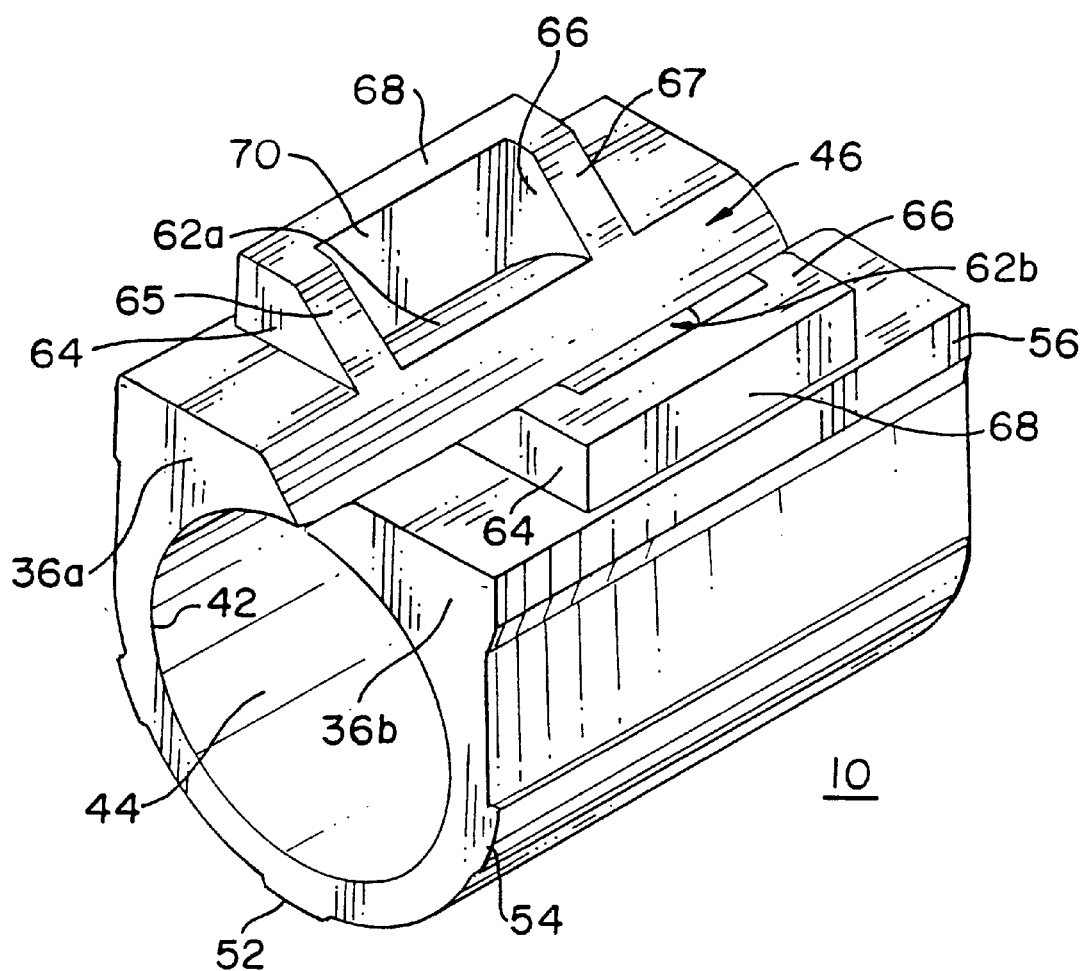
FIG. 9 is a bottom perspective showing of the pipe clamp cushion of FIG. 4.

FIGS. 3–5 show pipe cushion 10 in greater detail. Pipe cushion 10 is generally formed from flexible material such as an elastomeric polymer or soft plastic by well-known manufacturing techniques. Pipe cushion 10 includes an elongate flexible cushion body 34 having a generally planar base 36 and a generally continuous tubular wall 38. Tubular wall 38 includes an exterior surface 40 and a substantially cylindrical interior surface 42. Cylindrical interior surface 42 defines a longitudinal passageway 44 for accommodating pipe 12.

Planar base 36 is divided by a longitudinal slot 46 communicating with passageway 44. Slot 46 is defined by tapering surfaces 48 and 50 which taper outwardly from passageway 44 to exterior surface 40 so as to provide a tapered lead in and to assist in deflecting base portions 36a and 36b away from each other during cushion installation over a pipe as will be discussed further hereinbelow. Slot 46 is formed so as to substantially fully enclose pipe 12 within passageway 44.

Pipe cushion 10 preferably includes a crest rib 52 formed on exterior surface 40 at the apex, or crest 53, of cushion body 34. Crest rib 52 is a localized region of thickness, being preferably a region of raised relief on surface 40 of tubular wall 38 and located diametrically opposite slot 46. Crest rib 52 performs two important functions in the present invention. First, the relative thickness of crest rib 52 and the equidistant placement thereof from both planar base portions 36a and 36b ensure that tubular wall 38 deflects thereabout when pipe cushion 10 is inserted over pipe 12. Second, clamp brackets 18 and 20 will tend to ride over crest rib 52 as they are tightened about pipe cushion 10, causing crest rib 52 to deflect towards pipe 12 and to thereby provide better contact between cushion 10 and pipe 12.

Exterior surface 40 preferably also includes longitudinal side ribs 54 and longitudinal base ribs 56. Side ribs 54 are formed on either side of cushion body 34 about midway between crest rib 52 and planar base 36. Base ribs 56 are preferably formed on either side of cushion body 34 adjacent planar base 36. Both side ribs 54 and base ribs 56 are provided to make compressive contact between cushion body 34 and clamp brackets 18 and 20 prior to clamp brackets 18 and 20 pinching exterior surface 40 about crest 53 of pipe cushion 10. Accordingly, as clamp brackets 18 and 20 compress cushion body 34, each side rib 54 transmits the compressive force of clamp 16 towards pipe 12 prior to pipe cushion 10 being pinched and pulled about pipe 12 towards crest 53. Similarly, base ribs 56 are provided to make compressive contact between base portions 36a and 36b along slot 46 as pipe clamp brackets 18 and 20 are joined. Base ribs 56 thereby transmit the compressive clamping force prior to the development of significant pinching at the crest of pipe cushion 10 which could pull base portions 36a and 36b apart.

Pipe cushion 10 therefore conforms substantially completely about pipe 12 when secured with a two-piece clamp whereas prior art pipe cushions could be frictionally pulled towards the fastening means of such clamps. The pipe cushion 10 of the present invention, in providing more complete contact with pipe 12, also provides better mechanical isolation and thermal and electrical insulation of pipe 12 than is known in the prior art.

While pipe cushion 10 of the present invention preferably includes crest rib 52, side ribs 54, and base ribs 56, it may be appreciated that each may be provided independently of the others so as to provide compressive contact of the pipe cushion 10 about pipe 12.

As shown in FIGS. 6–9, pipe cushion 10 includes a pair of depending entry members 58 and 60 extending from the bottom surface 62 of planar base 36. Entry members 58 and 60 are positioned on either side of slot 46 with entry member 58 extending from base portion 62a and entry member 60 extending from base portion 62b. Entry members 58 and 60 are identically-formed members provided to extend into trough 17 of channel 14 when pipe cushion 10 is supported thereon. Each entry member 58, 60 includes a pair of side walls 64, 66 and a backwall 68 which define an interior region 70. Sidewalls 64 and 66 include tapered edges 65 and 67 respectively. Tapered edges 65 and 67 may be coplanar with the tapered lead into slot 46 as defined by surfaces 48 and 50. The actual alignment between tapered edges 65, 67 and surfaces 48, 50 should allow tapered edges 65 and 67 to make initial contact with pipe 12 being inserted into passageway 44. Furthermore, it is preferred that tapered edges make contact with pipe 12 prior to any portion of the pipe entering slot 46. The further from crest 53 that pipe 12 makes initial contact with tapered edges 65 and 67, the lower the insertion force required to open slot 46 to allow pipe 12 therethrough. Entry members 58 and 60 therefore allow for easier installation of pipe cushion 10 about pipe 12 by moving the points of initial engagement of the pipe with the cushion away from the deflection location.

Within interior region 70, entry members 58 and 60 enclose arcuate portions 62a and 62b of bottom surface 62. As more clearly shown in FIG. 7, arcuate portions 62a and 62b preferably maintain a substantially parallel alignment with cylindrical interior surface 42. Arcuate portions 62a and 62b thereby provide an installer more room to insert a finger into interior region 70 and manually spread planar base portions 36a and 36b apart as may be required when pipe cushion 10 is either installed over or removed from around a pipe 12.

Figure 10:
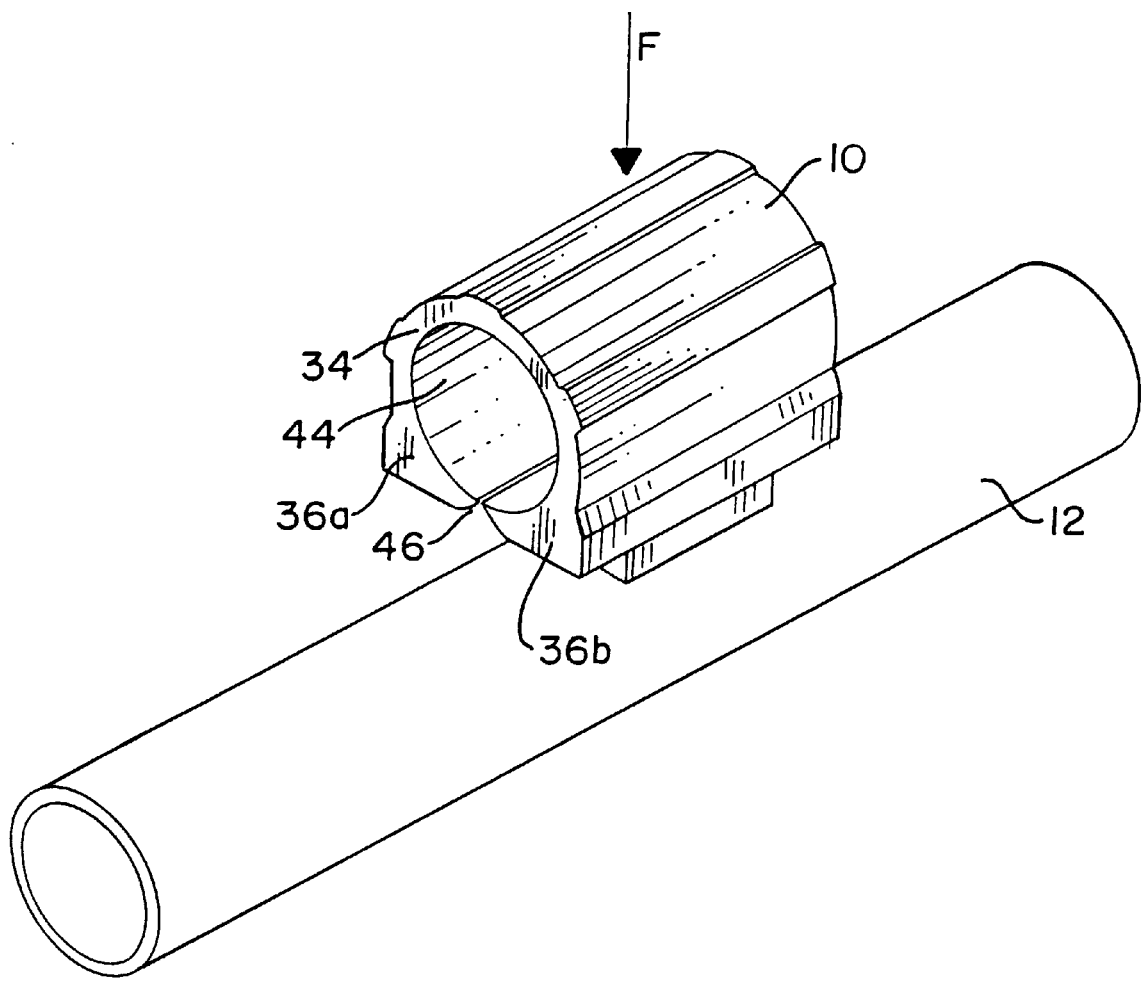
FIG. 10 depicts installation of the present invention about a pipe.

With reference to FIG. 10, pipe cushion 10 may be installed by placing pipe cushion 10 over pipe 12 and pushing down on pipe cushion 10 with a manual installation force F. As pipe 12 makes initial contact with tapered edges 65 and 67 of entry members 58, 60, installation force F will be transmitted through tapered edges 65 and 67 to cause planar base portions 36a and 36b to outwardly deflect away from each other. With the urging of installation force F, pipe 12 travels along edges 65 and 67 towards passageway 44 to further open slot 46 until pipe 12 is able to pass therethrough and into passageway 44. Once fully inserted into passageway 44, the resilience of pipe cushion body 34 ensures that planar base portions 36a and 36b return to an undeflected position whereby pipe cushion 10 engages substantially the entire circumference of a portion of pipe 12. Furthermore, and referring again to FIGS. 1 and 2, entry members 58 and 60 extend into trough 17 of channel 14. Bottom surface 62 of pipe cushion 10 engages the bent-over free edges of sidewall 15a and 15b of channel 14.

While entry members 58 and 60 are shown located on the bottom surface of pipe cushion 10, it is contemplated by the present invention that entry members 58 and 60 could also be employed with a pipe cushion body having an entry opening in any direction so as to force the opening wider while the pipe is still positioned outside the passageway of the pipe cushion.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An assembly for supporting a pipe to a structural support channel, comprising:
   a pipe cushion including a deformable pipe cushion body having a base for positioning over said structural support channel, said base having a slot therethrough;
   said body including a continuous tubular wall extending upwardly from said base and being divided by said slot, said tubular wall forming a pipe supporting passageway through said body, said tubular wall conforming substantially fully about a pipe inserted into said passageway, said slot being in communication with said passageway for permitting insertion of said pipe therein, said body further including a crest spaced from said slot, said crest including a crest rib; and
   a pair of pipe clamp elements, said pipe clamp elements having a first end attachable to said channel and a second end for mutual connection, about said pipe cushion;
   said second ends of said pipe clamp elements being connectable at said crest rib for urging said body into compression about said pipe.

2. An assembly of claim 1 wherein said base of said pipe cushion body includes a tapered lead-in portion about said slot for facilitating said passage of said pipe therethrough.

3. An assembly of claim 1 wherein said body is generally cylindrical and wherein said pipe cushion body includes said crest diametrically opposed to said slot.

4. An assembly of claim 3 wherein said body is deformable about said crest.

5. An assembly of claim 4 wherein said pair of pipe clamp element second ends include connection flanges which are connectable to one another so as to secure said pipe cushion to said channel.

6. An assembly of claim 5 where said pipe clamp elements conform generally to said shape of said cushion body.

7. An assembly of claim 6 where said crest rib includes an area of increased thickness of said tubular wall.

8. An assembly of claim 6 where said crest rib includes an area of raised relief.

9. An assembly of claim 8 where said tubular wall includes a pair of lateral localities of raised relief for engagement by said pipe clamp elements.

10. An assembly of claim 1, wherein said cushion body further includes a pair of entry members located to either side of and spaced from said slot, said entry members providing a tapered lead-in into said slot so as to expand said slot upon said entry members making contact with said pipe being inserted into said passageway of said cushion body.

11. A pipe cushion for supporting a pipe to a structural channel having a pair of elongate adjustably coupled pipe clamp elements, said pipe clamp elements being positionable about said pipe and mutually connectable to each other, said pipe cushion comprising:
    an elongate deformable cushion body for positioning on said structural channel, said body having a generally continuous tubular wall including a base and defining a central passageway through, said tubular wall having a slot through said base in communication with passageway for passage of said pipe therethrough, and for fully encompassing said pipe inserted into said passageway;
    said continuous wall defining a pair of spaced apart base ribs having raised relief and being engageable with said clamp elements for forcing said tubular wall in substantial conformance with said pipe.

12. A pipe cushion of claim 11 wherein said tubular wall includes an outwardly directed crest diametrically opposed from said slot.

13. A pipe cushion of claim 12 wherein said crest includes an area of increased wall thickness.

14. A pipe cushion of claim 12 wherein said cushion body is generally deformable about said crest.

15. A pipe cushion of claim 11, wherein said cushion body further includes a pair of side ribs having raised relief located between said crest and said planar base, said pair of side ribs provided to engage said pipe clamp.

16. A pipe cushion of claim 11, wherein said cushion body further includes a pair of entry members located to either side of said slot, said entry members providing a tapered lead-in into said slot for expanding said slot upon said entry members making contact with said pipe and prior to said pipe being inserted into said passageway of said cushion body.

17. A pipe cushion for supporting a pipe to a structural channel, said pipe cushion comprising:
    an elongate deformable cushion body having a base and a longitudinal slot through said base;
    said body including a tubular wall extending from one side of said slot to the other side of said slot and defining a central passageway through said body, said passageway being in communication with said slot for passage of said pipe into said passageway;
    said cushion body further including a pair of entry members located to either side of and spaced from said slot, said entry members providing having opposed inclined side wall surfaces extending from an external surface of said tubular wall inwardly towards said passages and a tapered lead-in into said slot so as to expand said slot upon said entry members making contact with said pipe and prior to said pipe being inserted into said passageway of said cushion body.

18. A pipe cushion of claim 17 wherein said cushion body further includes a base for placement against said structural channel.

19. A pipe cushion of claim 18 wherein said slot extends through said base.

* * * * *